United States Patent Office 3,598,802
Patented Aug. 10, 1971

3,598,802
AZO COMPOUNDS FROM 1-NAPHTHYLAMINES
Max A. Weaver, Clarence A. Coates, Jr., and Herman S. Pridgen, Kingsport, Tenn., assignors to Eastman Kodak Company, Rochester, N.Y.
No Drawing. Filed Dec. 19, 1968, Ser. No. 785,364
Int. Cl. C07c 107/08; C09b 29/06
U.S. Cl. 260—196
3 Claims

ABSTRACT OF THE DISCLOSURE

Azo compounds having a 2-halo-4,6-dinitrophenyl or 2-cyano-4,6-dinitrophenyl diazo component and a 1-naphthylamine coupling component are useful as dyes for hydrophobic, particularly polyester, textile materials.

This invention relates to certain novel azo compounds and, more particularly, to azo compounds containing a 1-naphthylamine coupling component and to polyester textile materials dyed with the novel compounds.

The novel compounds of the invention have the general formula (I)
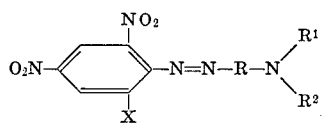

wherein:
X is cyano, chlorine or bromine;
R is 1,4-naphthylene or 1,4-naphthylene substituted with lower alkyl, lower alkoxy, or hydroxy;
$R^1$ is a cycloalkyl radical, an aralkyl radical or, when X is cyano, an alkyl radical or a phenyl radical; and
$R^2$ is hydrogen, an alkyl radical, or an aralkyl radical.

The novel azo compounds of the invention produce navy- to greenish-blue shades on polyester fibers when applied thereto according to conventional dyeing procedures. The novel azo compounds exhibit improved dyeability, including improved build-up or exhaust, and improved fastness properties such as fastness to light when compared to prior art compounds containing a naphthylamine group. For example, the compounds of the invention possess superior dyeability and/or light-fastness when compared to the compounds disclosed in British Pat. 985,254. The compounds of the invention are advantageously economical because of the cost of the reactants and the convenience with which they are prepared.

Chlorine, bromine, methyl, ethyl, propyl, butyl, methoxy, ethoxy, propoxy and butoxy are examples of the halogen atoms which X can represent and the alkyl and alkoxy groups which can be present on the naphthylene group represented by R. Preferred groups represented by R have the formula

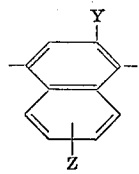

in which Y is hydrogen, lower alkyl or lower alkoxy; and Z is hydrogen, hydroxy or lower alkoxy. As used herein to describe a group containing an alkyl moiety, "lower" designates a carbon content of from 1 to about 4 carbon atoms.

The cycloalkyl radicals represented by $R^1$ can contain about 5 to 7 ring carbon atoms and can be unsubstituted or substituted, for example, with lower alkyl. Cyclopentyl, cyclohexyl, 2-methylcyclohexyl, 3-methylcyclohexyl, 4-methylcyclohexyl, 3,3,5-trimethylcyclohexyl, cycloheptyl, etc. are typical cycloalkyl radicals represented by $R^1$. The alkyl radicals which each of $R^1$ and $R^2$ can represent from 1 to about 8 carbon atoms and can be straight- or branch-chain, unsubstituted or substituted, for example, with cyano, hydroxy, lower alkoxy, lower alkanoyloxy, or cycloalkyl. Acetoxy, propionoxy, and butyroxy are examples of such alkanoyloxy substituents. Examples of the alkoxy and cycloalkyl substituents which can be present on the alkyl radicals represented by each of $R^1$ and $R^2$ are set forth hereinabove. Methyl, ethyl, propyl, butyl, isobutyl, pentyl, hexyl, 2-ethylhexyl, heptyl, octyl, 2-hydroxyethyl, 2,3-dihydroxypropyl, 2-cyanoethyl, 3-acetoxypropyl, 4-methyl-2-pentyl, cyclohexylmethyl, 1-cyclohexylethyl, 4-methylcyclohexylmethyl, 1-cyclopentylethyl, cycloheptylmethyl and the like are typical alkyl radicals represented by $R^1$ and $R^2$. The alkyl radicals represented by each of $R^1$ and $R^2$ preferably are unsubstituted or substituted lower alkyl.

The phenyl radicals represented by $R^1$ can be unsubstituted or substituted, for example with lower alkyl, lower alkoxy, or halogen. Tolyl, ethoxyphenyl, chlorophenyl and bromophenyl are typical phenyl radicals. The alkyl moiety of the aralkyl radicals represented by each of $R^1$ and $R^2$ is straight- or branch-chain lower alkyl. The aryl moiety of the aralkyl radicals preferably is monocyclic carbocyclic aryl such as phenyl and phenyl substituted with lower alkyl, lower alkoxy, halogen, hydroxy, or lower alkoxycarbonyl. Benzyl, 2-phenylethyl, 1-phenylethyl, p-methoxycarbonylbenzyl, m-ethoxycarbonylbenzyl, 1-p-methoxycarbonylphenylpropyl, m-chlorobenzyl, o,p-dibromobenzyl, p-methylbenzyl, 2-p-ethoxyphenylethyl, etc. are examples of the aralkyl radicals represented by $R^1$ and $R^2$. The aralkyl and cycloalkylalkyl groups represented by each of $R^1$ and $R^2$ are further defined by the formulae —$R^3$—$R^4$ and —$R^3$—$R^5$ in which $R^3$ is lower alkyl; $R^4$ is cycloalkyl having about 5 to 7 ring carbon atoms or cycloalkyl having about 5 to 7 ring carbon atoms substituted with lower alkyl; and $R^5$ is phenyl or phenyl substituted with lower alkyl, lower alkoxy, halogen, hydroxy, or lower alkoxycarbonyl.

Particularly valuable dyes for polyester textile materials are those having the formulae

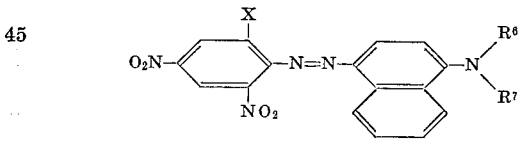

and

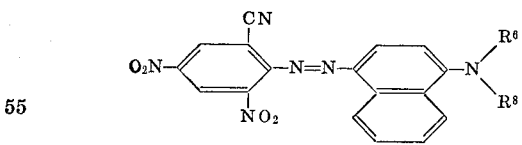

wherein:
X is chlorine or bromine;
$R^6$ is hydrogen or lower alkyl;
$R^7$ is cyclohexyl or methylcyclohexyl; and
$R^8$ is cyclohexyl, methylcyclohexyl, benzyl, or methylbenzyl.

The novel azo compounds of the invention are prepared according to conventional procedures by diazotizing a 2-halo- or 2-cyano-4,6-dinitroaniline and coupling the resulting diazonium salt with a compound having the formula (II)
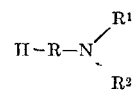

The coupling compounds of Formula II are prepared by known techniques, for example, by the reaction of a 1-nitronaphthalene with an aldehyde or ketone in the presence of hydrogen and a catalyst such as Raney nickel, platinum or palladium. Suitable aldehydes and ketones include acetaldehyde, isobutyraldehyde, propionaldehyde, n-butyraldehyde, phenylacetaldehyde, cyclohexanecarboxaldehyde, benzaldehyde, cyclohexanone, 2-methylcyclohexanone, 3-methylcyclohexanone, 4-methylcyclohexanone, cyclopentanone, cycloheptanone, isophorone, acetone, methyl ethyl ketone, methyl phenyl ketone, methyl cyclohexyl ketone, etc. The coupling compounds can also be synthesized by alkylation of a 1-naphthylamine using alkyl halides, alkyl sulfates, aralkyl halides, etc. or by reacting a 1-naphthylamine with epoxides such as ethylene oxide or with activated vinyl compounds such as acrylonitrile.

The following examples further illustrate the preparation of the novel compounds of the invention.

EXAMPLE 1

To 5 ml. of conc. $H_2SO_4$ is added 0.72 g. dry $NaNO_2$ portionwise. The solution is cooled and 10 ml. of 1:5 acid (1 part propionic:5 parts acetic acid) is added below 15° C. The mixture is cooled again and 2-bromo-4,6-dinitroaniline (2.62 g.) is added, followed by 10 ml. additional 1:5 acid, all at 0–5° C. After stirring at 0–5° C. for 1 hr., the diazonium solution is added to a solution of 2.25 g. of N-cyclohexyl-1-naphthylamine in 100 ml. of conc. $H_2SO_4$, below 10° C. After allowing to stand for 1 hr. at below 10° C., the coupling mixture is drowned into water. The blue product is collected by filtration, washed with water, and dried in air. The azo compound obtained, 1-(2-bromo-4,6-dinitrophenylazo)-N-cyclohexyl-4-naphthylamine, produces clear blue shades on polyester fibers.

EXAMPLE 2

2-cyano-4,6-dinitroaniline (2.08 g.), is slurried in 35 ml. of 70% $H_2SO_4$ at 15° C. The mixture is cooled to −2° C. and a solution of 0.72 g. sodium nitrite in 5 ml. of conc. $H_2SO_4$ is added at −2 to 0° C. The reaction mixture is stirred at 0° C. for 2 hr. and is then added to a solution of 1.71 g. N-ethyl-1-naphthylamine dissolved in 100 ml. of conc. $H_2SO_4$ at below 10° C. After coupling for 1 hr., the dye is precipitated by drowning in water. The product is collected by filtration, washed with water, and air dried. The product, 1-(2-cyano-4,6-dinitrophenylazo)-N-ethyl-4-naphthylamine, produces greenish-blue shades on polyester fabrics.

EXAMPLE 3

The procedure described in Example 2 is repeated, substituting 2.25 g. of N-cyclohexyl-1-naphthylamine for the naphthylamine employed in the preceding example. The azo compound thus prepared, 1-(2-cyano-4,6-dinitrophenylazo)-N-hexyl-4-naphthylamine, produces bright greenish-blue shades on polyester fabrics.

The compounds disclosed in the examples of the table, which conform to Formula I, are prepared according to the procedures described in Examples 1 and 2. The novel compounds set forth in the table impart blue shades to polyester fibers.

TABLE

| Ex. No. | X | Substituents on 1,4-naphthylene radical R | $R^1$ | $R^2$ |
|---|---|---|---|---|
| 4 | Br | None | 2-methylcyclohexyl | H. |
| 5 | Br | do | 3-methylcyclohexyl | H. |
| 6 | Br | do | 4-methylcyclohexyl | H. |
| 7 | Br | do | 3,3,5-trimethylcyclohexyl | H. |
| 8 | Br | do | Cyclopentyl | H. |
| 9 | Br | do | Cyclohexyl | Ethyl. |
| 10 | Br | do | do | Isobutyl. |
| 11 | Br | 5-OH | do | Do. |
| 12 | Br | 2-methyl | do | H. |
| 13 | Br | None | do | Benzyl. |
| 14 | Cl | do | do | H. |
| 15 | Cl | 6-OH | do | H. |
| 16 | Cl | 7-OH | do | H. |
| 17 | Cl | 2-ethoxy | do | H. |
| 18 | Cl | None | 3-methylcyclohexyl | H. |
| 19 | Cl | do | 4-methylcyclohexyl | H. |
| 20 | Cl | do | Cyclohexyl | Methyl. |
| 21 | Cl | 6-ethoxy | do | Propyl. |
| 22 | Cl | None | do | Butyl. |
| 23 | Cl | do | Benzyl | H. |
| 24 | Cl | do | p-Methylbenzyl | H. |
| 25 | Cl | 5-methoxy | p-Methoxycarbonylbenzyl | H. |
| 26 | Cl | None | Cyclohexyl | Benzyl. |
| 27 | Cl | do | Benzyl | Do. |
| 28 | Cl | do | 3,3,5-trimethylcyclohexyl | Ethyl. |
| 29 | Cl | do | 4-methylcyclohexyl | Do. |
| 30 | CN | do | Cyclohexyl | H. |
| 31 | CN | do | 4-methylcyclohexyl | H. |
| 32 | CN | do | 3-methylcyclohexyl | H. |
| 33 | CN | 5-OH | do | H. |
| 34 | CN | 6-OH | Cyclopentyl | H. |
| 35 | CN | 7-OH | Cyclohexyl | H. |
| 36 | CN | None | do | Ethyl. |
| 37 | CN | do | do | Isobutyl. |
| 38 | CN | do | 3,3,5-trimethylcyclohexyl | H. |
| 39 | CN | do | Cycloheptyl | H. |
| 40 | CN | do | Isobutyl | H. |
| 41 | CN | do | Isopropyl | H. |
| 42 | CN | do | 1-methylpropyl | H. |
| 43 | CN | do | 1-phenylethyl | H. |
| 44 | CN | do | 1-cyclohexylethyl | H. |
| 45 | CN | do | 4-methylcyclohexylmethyl | H. |
| 46 | CN | do | 2-phenylethyl | H. |
| 47 | CN | do | Benzyl | H. |
| 48 | CN | do | m-Butoxycarbonylbenzyl | m-Butoxycarbonylbenzyl. |
| 49 | CN | do | o,m-Dihydroxybenzyl | 2,3-dihydroxypropyl |
| 50 | CN | do | Cyclohexyl | 2-cyanoethyl |
| 51 | CN | do | Butyl | H. |
| 52 | CN | do | Cyclohexylmethyl | H. |
| 53 | CN | do | Ethyl | Ethyl. |
| 54 | CN | do | Benzyl | Do. |
| 55 | CN | do | Cyclohexyl | Benzyl. |

TABLE

| Ex. No. | X | Substituents on 1,4-naphthylene radical R | R¹ | R² |
|---|---|---|---|---|
| 56 | CN | do | Ethyl | 2-acetoxyethyl. |
| 57 | CN | do | Phenyl | H. |
| 58 | CN | do | do | Benzyl. |
| 59 | CN | 2-methyl | Cyclohexyl | H. |
| 60 | CN | do | Ethyl | H. |
| 61 | CN | do | do | Ethyl. |

The compounds of the invention have been described in detail with reference to preferred embodiments thereof, but it will be understood that variations and modifications can be effected within the scope of the invention.

The compounds of the invention can be applied to linear polyester textile materials according to known disperse dyeing procedures, employing an aqueous medium which can contain adjuvants such as surfactants, dispersing agents and carriers. The following example illustrates a carrier dyeing procedure for applying the azo compounds of the invention to dye polyester textile materials.

EXAMPLE 62

The azo compound of Example 3 (0.1 g.) is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for removal of residual carrier) for 5 minutes at 350° F.

The compounds of the invention can also be applied to polyester textile materials by the thermal fixation technique described in U.S. Pat. 2,663,612 and in the American Dyestuff Reporter, 42, 1 (1953). The following procedure describes how the azo compounds of the invention can be applied to polyester materials by the heat fixation technique.

EXAMPLE 63

A mixture of 500 mg. of the compound of Example 1, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a microsize container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing 1 ml. of a complex diaryl sulfonate surfactant, (compound 8–S); 3 ml. of a 3% solution of a sodium N-methyl-N-oleoyltaurate (Igepon T–S1); 8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.; 10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and fastness to light and sublimation when tested according to the procedures described in the 1966 edition of the Technical Manual of the American Association of Textile Chemists and Colorists.

The compounds of the invention also are useful as an economical blue component of dye mixtures which produce black dyeings on polyester fibers. The following example illustrates a procedure for obtaining black dyeings on polyester fibers.

EXAMPLE 64

34 mg. of the azo compound of Example 1, 33 mg. of N-[4-(2,6-dichloro-4-nitrophenylazo)phenyl]thiomorpholine-S,S-dioxide, and 4.5 mg. of 4-(2-chloro-4-nitrophenylazo)-N-ethyl-N,2-phthalimidoethyl-m-toluidine are dissolved in 10 ml. of 2-methoxyethanol and then 6 ml. of a 3% Igepon T solution, 3 ml. of a 5% sodium lignin sulfonate solution and sufficient demineralized water to bring the total volume to about 150 ml. are added. 1.5 ml. of Tanavol is then added to the bath followed by a 5 g. fabric of poly(ethylene terephthalate) fibers. The fabric is stirred cold for 5 minutes, stirred at 80° C. for 15 minutes, and then the dye bath is brought slowly to the boil and maintained at the boil for one hour. The dyed fabric is rinsed in cold water, scoured, rinsed again, dried at 250° F. and finally heat set for 5 minutes at 350° F. The fabric is dyed a deep shade of black having good fastness properties.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and ""Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pat. 2,945,010; 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly-(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc. Although the compounds of the invention are especially suitable for dyeing polyester materials, they can also be used to dye other hydrophobic textile materials such as cellulose acetate and polyamide fibers.

We claim:
1. A compound having the formula

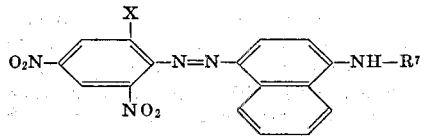

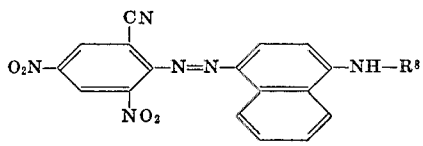

wherein
X is chlorine or bromine;
$R^7$ is cyclohexyl or methylcyclohexyl; and
$R^8$ is cyclohexyl, methylcyclohexyl, benzyl or methylbenzyl.

2. A compound according to claim 1 having the formula

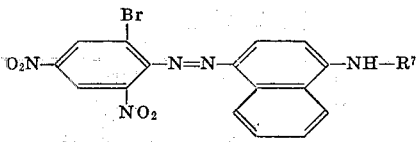

3. A compound according to claim 1 having the formula

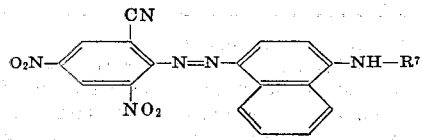

References Cited
UNITED STATES PATENTS

| | | | |
|---|---|---|---|
| 2,016,944 | 10/1935 | Ohlendorf | 260—196 |
| 2,173,055 | 9/1939 | Hitch et al. | 260—198 |
| 2,173,417 | 9/1939 | Huber | 260—198 |
| 2,311,033 | 2/1943 | Dickey | 260—198(X) |

FOREIGN PATENTS 985,254   3/1965   Great Britain _____ 260—198

CHARLES B. PARKER, Primary Examiner
C. F. WARREN, Assistant Examiner

U.S. Cl. X.R.

8—26, 41, 50; 260—198, 199, 471, 570.5, 570.7, 570.8, 570.9, 571, 573, 576, 577